US012427529B2

(12) United States Patent
Coray

(10) Patent No.: US 12,427,529 B2
(45) **Date of Patent: *Sep. 30, 2025**

(54) SYSTEMS, DEVICES AND METHODS FOR IMPROVED EFFICIENCY OF BALL MILLS

(71) Applicant: FREEPORT MINERALS CORPORATION, Phoenix, AZ (US)

(72) Inventor: Dale Coray, Pender Island (CA)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,951

(22) Filed: May 14, 2024

(65) Prior Publication Data

US 2024/0299948 A1 Sep. 12, 2024

Related U.S. Application Data

(62) Division of application No. 18/476,951, filed on Sep. 28, 2023, now Pat. No. 12,128,419, which is a division of application No. 17/574,971, filed on Jan. 13, 2022, now Pat. No. 11,772,101.

(51) Int. Cl.
*B02C 17/22* (2006.01)
*B02C 17/10* (2006.01)
*B02C 17/18* (2006.01)

(52) U.S. Cl.
CPC ............ *B02C 17/22* (2013.01); *B02C 17/183* (2013.01)

(58) Field of Classification Search
CPC ........ B02C 17/22; B02C 17/183; B02C 17/10
See application file for complete search history.

(56) References Cited

U.S. PATENT DOCUMENTS 1,275,184 A 8/1918 Fairchild
1,370,699 A * 3/1921 Mitchell ................ B02C 17/22 241/70
1,590,655 A 6/1926 Spicer
1,975,501 A 10/1934 Carman
1,985,801 A 12/1934 Sheehan
(Continued)

FOREIGN PATENT DOCUMENTS

CL 202300134 10/2023
CN 112473893 A 3/2021
(Continued)

OTHER PUBLICATIONS

IP Australia Examination Report No. 1 from Australia Patent Application No. 2024204441 dated Sep. 2, 2024.
(Continued)

*Primary Examiner* — Mohammed S. Alawadi
(74) *Attorney, Agent, or Firm* — Snell & Wilmer L.L.P.

(57) ABSTRACT

A drum assembly for a ball mill system may comprise: a drum having a first flange extending axially forward from a first radial wall, a second flange extending axially aft from a second radial wall, and a cylinder shell extending axially from a first radially outer end of the first radial wall to a second radially outer end of the second radial wall; a frame coupled to the first flange; and an inlet liner coupled to the frame, the inlet liner comprising a plurality of inlet segments disposed circumferentially adjacent to each other, the inlet liner defining an inlet radius for the drum assembly.

20 Claims, 11 Drawing Sheets

(56) References Cited

U.S. PATENT DOCUMENTS

| | | | | |
|---|---|---|---|---|
| 2,893,650 | A | | 7/1959 | Maclean |
| 3,269,668 | A | | 8/1966 | Hall |
| 3,604,637 | A | * | 9/1971 | Sabaski .................. B02C 17/22 241/70 |
| 11,772,101 | B2 | | 10/2023 | Coray |
| 2017/0142302 | A1 | | 5/2017 | Shaw et al. |
| 2024/0024884 | A1 | | 1/2024 | Coray |

FOREIGN PATENT DOCUMENTS

| | | |
|---|---|---|
| CN | 214288557 U | 9/2021 |
| GB | 461726 | 2/1937 |

OTHER PUBLICATIONS

China National Intellectual Property Administration Notice on the First Office Action, Search Report and Text of the First Office Action (translated to English) from Chinese Patent Application No. 202310071891.9 dated Nov. 1, 2024.

USPTO Non-Final Office Action from U.S. Appl. No. 17/574,971 dated Mar. 31, 2023.

Reply to Office Action from U.S. Appl. No. 17/574,971 dated May 17, 2023.

USPTO Non-Final Office Action from U.S. Appl. No. 17/574,971 dated Jun. 9, 2023.

Reply to USPTO Non-Final Office Action from U.S. Appl. No. 17/574,971 dated Jul. 14, 2023.

USPTO Notice of Allowance from U.S. Appl. No. 17/574,971 dated Aug. 23, 2023.

IP Australia Examination Report from Australia Patent Application No. 2023200119 dated Oct. 9, 2023.

Canadian IPO Office Action from Canadian Patent Application No. 3186176 dated Mar. 14, 2024.

USPTO Non-Final Office Action from U.S. Appl. No. 18/476,951 dated Apr. 11, 2024.

Response to Australian Examination Report from Australian Application No. 2023200119 dated Apr. 11, 2024.

IP Australia Examination Report No. 2 from Australian App No. 202300119 dated Apr. 30, 2024.

Reply to USPTO Non-Final Office Action from U.S. Appl. No. 18/476,951 dated May 8, 2024.

Response to IP Australia Examination Report No. 2 from Australian App No. 202300119 dated Jun. 2, 2024.

USPTO Notice Of Allowance from U.S. Appl. No. 18/476,951 dated Jul. 3, 2024.

Response to Canadian Office Action from Canadian Application No. 3186176 dated Jul. 12, 2024.

Chile National Institute of Industrial Property-INAPI Expert Report on Application for Patent of Invention from Chile Application No. 202303132, dated May 30, 2025 with Google machine translation in English.

Chile National Institute of Industrial Property-INAPI Search Report on Application for Patent of Invention from Chile Application No. 202303132, dated May 30, 2025 with Google machine translation in English.

Response to Chile National Institute of Industrial Property-INAPI Expert Report on Application for Patent of Invention from Chile Application No. 202303132, dated Aug. 25, 2025 with Google machine translation in English.

* cited by examiner

SYSTEMS, DEVICES AND METHODS FOR IMPROVED EFFICIENCY OF BALL MILLS

CROSS REFERENCE TO RELATED APPLICATIONS

This application is a divisional application of and claims priority to U.S. patent application Ser. No. 18/476,951, entitled "SYSTEMS, DEVICES AND METHODS FOR IMPROVED EFFICIENCY OF BALL MILLS," which was filed on Sep. 28, 2023 (the "'951 Application"), and U.S. patent application Ser. No. 17/574,971, entitled "SYSTEMS, DEVICES AND METHODS FOR IMPROVED EFFICIENCY OF BALL MILLS," which was filed on Jan. 13, 2022 (the "'971 Application"), now U.S. Pat. No. 11,772,101 and issued on Oct. 3, 2023. The aforementioned applications are hereby incorporated by reference herein in their entirety.

FIELD

The present invention generally relates to the grinding of ore and, more particularly, to improved ball mill systems and methods.

BACKGROUND

The recovery of minerals form ore, such as valuable metal-containing ore, typically involves mechanical size reduction of the ore particles. For example, ore can be crushed or ground by a grinding system prior to metal recovery processing. Grinding systems can use tumbling ball mills or ball mills in both wet and dry systems, in batch and continuous operations, and/or on small and large scales.

SUMMARY OF THE INVENTION

A drum assembly is disclosed herein. The drum assembly may comprise: a drum having a first flange extending axially forward from a first radial wall, a second flange extending axially aft from a second radial wall, and a cylinder shell extending axially from a first radially outer end of the first radial wall to a second radially outer end of the second radial wall; a frame coupled to the first flange; and an inlet liner coupled to the frame, the inlet liner comprising a plurality of inlet segments disposed circumferentially adjacent to each other, the inlet liner defining an inlet radius for the drum assembly.

In various embodiments, each segment in the plurality of inlet segments comprises: an axially aft flange; an axially forward flange spaced apart axially forward from the axially aft flange; and a radially inner wall extending from a first radially inner end of the axially forward flange to a second radially inner end of the axially aft flange. The radially inner wall may partially define the inlet radius of the drum assembly.

In various embodiments, the inlet liner is configured to prevent a backflow of material being grinded forward of the inlet liner.

In various embodiments, the inlet liner is configured to receive a feed spout having a radially outer surface radius between 95% and 100% of a radially inner surface radius of the inlet liner.

In various embodiments, the drum assembly further comprises a first plurality of inlet segments disposed radially outward from the inlet liner and a second plurality of inlet segments disposed radially outward from the first plurality of inlet segments. Each inlet segment in the first plurality of inlet segments and the second plurality of inlet segments may be coupled to the first radial wall.

A ball mill system is disclosed herein. The ball mill system may comprise: a feed chute comprising an inlet housing, a main housing, and a feed spout, the feed spout including a tube extending axially from the main housing to a distal end; and a drum assembly in fluid communication with the feed chute, the drum assembly comprising: a drum having a first flange extending axially forward from a first radial wall, a second flange extending axially aft from a second radial wall, and a cylinder shell extending axially from a first radially outer end of the first radial wall to a second radially outer end of the second radial wall, a frame coupled to the first flange, and an inlet liner coupled to the frame the inlet liner defining a drum inlet, the distal end of the tube extending axially aft of an axially forward end of the inlet liner.

In various embodiments, the inlet liner comprises a plurality of inlet segments disposed circumferentially adjacent to each other.

In various embodiments, the inlet liner defines a drum inlet radius for the drum assembly. The tube of the feed spout may comprise a radially outer surface defining an outer surface radius of the feed spout. In various embodiments, the outer surface radius is between 95% and 100% of the drum inlet radius.

In various embodiments, the drum assembly further comprises a discharge assembly, the discharge assembly including an outlet liner, the outlet liner comprising a plurality of outlet segments, each outlet segment in the plurality of outlet segments disposed circumferentially adjacent to an adjacent outlet segment in the plurality of outlet segments, each outlet segment in the plurality of outlet segments coupled to the second radial wall. The inlet liner may comprise a plurality of inlet segments disposed circumferentially adjacent to each other. Each inlet segment in the plurality of inlet segments may include an axially aft flange, an axially forward flange spaced apart axially forward from the axially aft flange, and a radially inner wall extending from a first radially inner end of the axially forward flange to a second radially inner end of the axially aft flange. Each outlet segment in the plurality of outlet segments may include a second axially aft flange, a second axially forward flange spaced apart axially forward from the second axially aft flange, and a second radially inner wall extending from a first radially inner end of the second axially forward flange to a second radially inner end of the second axially aft flange. The axially forward flange of each inlet segment in the plurality of inlet segments may be coupled to the first radial wall of the drum. The second axially aft flange of each outlet segment in the plurality of outlet segments may be coupled to the second radial wall of the drum.

A retrofitting process for a ball mill system is disclosed herein. The retrofitting process may comprise: extending an axial length of a feed spout for the ball mill system, the feed spout defining an outer surface radius; coupling a frame to a first flange of a drum, the first flange disposed at an axially forward end of the drum; and coupling an inlet liner to the frame, the inlet liner defining a drum inlet radius of a drum assembly.

In various embodiments, the retrofitting process further comprises: decoupling an outlet liner from an aft radial wall of the drum; and coupling a second outlet liner to the aft radial wall of the drum.

In various embodiments, the feed spout extends axially aft of an axially forward end of the inlet liner in response to the ball mill system being assembled for operation.

In various embodiments, the outer surface radius is between 95% and 100% of the drum inlet radius.

In various embodiments, the inlet liner comprises a plurality of liner segments, each liner segment in the plurality of liner segments disposed circumferentially adjacent to an adjacent liner segment in the plurality of liner segments.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWING FIGURES

DETAILED DESCRIPTION

The present disclosure refers to and describes methods and systems for mechanical size reduction of ores by flanged roller grinding systems. It should be appreciated that the broader process steps described herein may be accomplished by a variety of equipment configurations and sub-process steps, each of which are within the scope of the present invention. For example, the following disclosure describes improving the wear resistance of components of flanged roller grinding systems. Particular equipment is generally described as being suitable for such wear resistance improvement. However, other equipment may be implemented or combined with other equipment to accomplish the function of grinding systems described herein. Additionally, or alternatively, the present system and method may be implemented or adapted to process other starting materials and/or to produce different final products.

Disclosed herein are systems, methods, and devices for improving efficiency of ball in grinding systems for mechanical size reduction of ore particles or the like. In various embodiments, a reduced output radius of typical ball mill devices may increase efficiency of a ball mill system. For example, an improved ball mill system disclosed herein increase load throughput capacity compared to typical ball mill systems.

Figure 1:
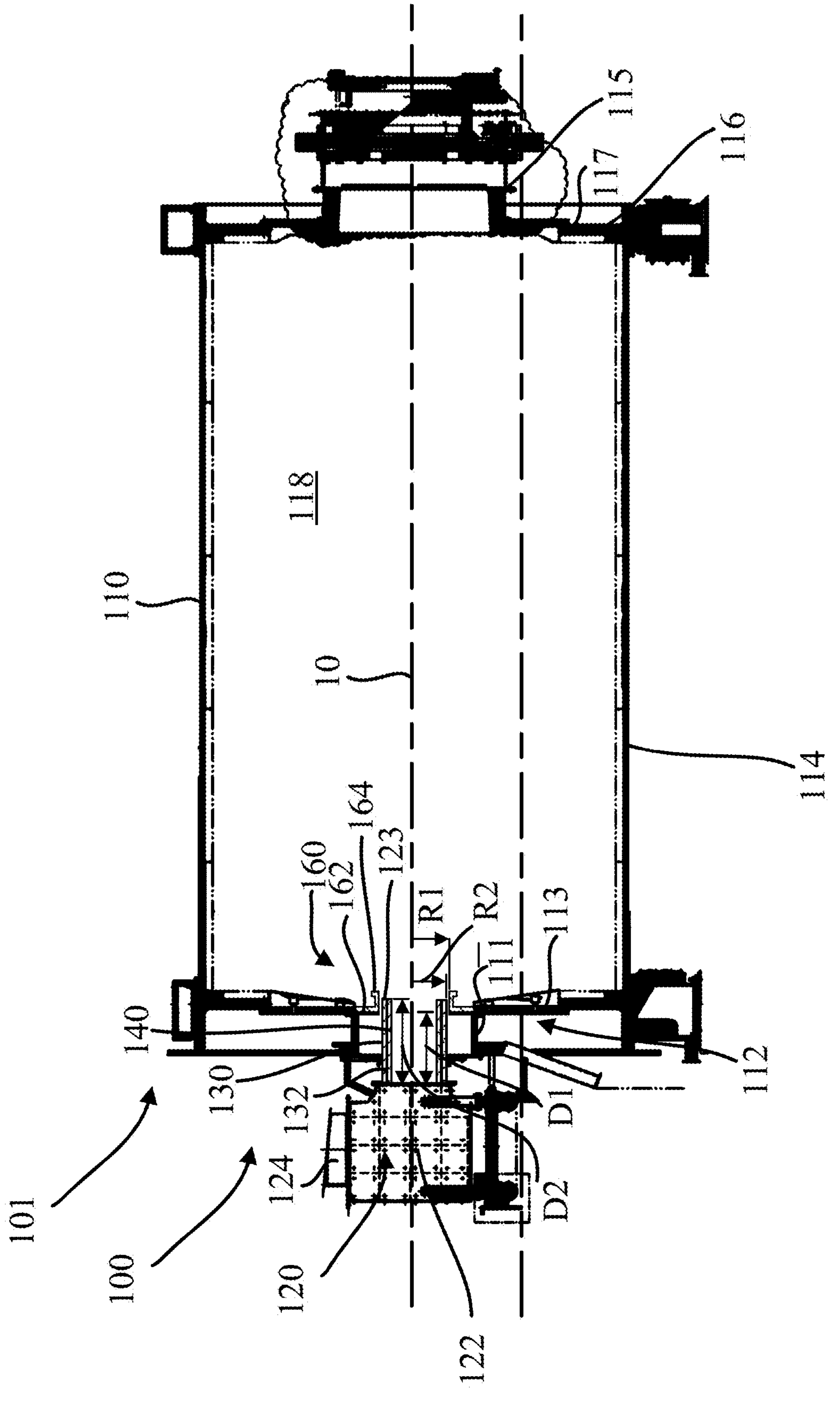
FIG. 1 illustrates a cross-sectional view of a ball mill system in accordance with the present disclosure.

Referring now to FIG. 1, a cross-sectional view of a ball mill system 100 is illustrated in accordance with various embodiments. The ball mill system 100 comprises a drum assembly 101 and a feed chute 120. The drum assembly 101 comprises a drum 110. The drum 110 defines a central axis 10 of the ball mill system 100. During operation of the ball mill system 100, the drum assembly 101 is configured to rotate about the central axis 10. In this regard, a drive motor may be configured to rotate the drum assembly 101 about the central axis 10 through a gear system or the like. During operation of the ball mill system 100, a plurality of balls disposed within the drum assembly 101 are configured to grind a material from a larger particle size to a smaller particle size. The plurality of balls may comprise approximately 30% to 45% of a volume of the ball mill system 100 during operation.

A material to be grinded by the ball mill system 100 (e.g., ore or the like) is fed through the feed chute 120 (e.g., via a screw conveyor or the like). The material may be fed in a solid state or in a slurry form for wet grinding applications. As the material passes axially through the drum assembly 101 (i.e., from a forward end to an aft end of the drum assembly 101, the plurality of balls disposed within the drum assembly 101 may be configured to crush the material due to a gravitational force of each ball in the plurality of balls exceeding a centrifugal force within the drum assembly 101. In this regard, in response to rotating within the drum assembly 101, each ball in the plurality of balls travel along a radially inner surface of the drum assembly 101 until the balls gravitational force exceeds the centrifugal force due to rotation of the drum assembly 101, causing each ball to tumble back to a bottom portion of the drum assembly 101, resulting in grinding of the material traveling axially through the drum assembly 101.

The drum assembly 101 comprises the drum 110, a feed head 112, a cylinder shell 114, and a discharge head 116. The feed head 112 comprises an axial portion 111 of the drum 110 (e.g., a forward axial portion of the drum 110) defining a flange and a radial portion 113 of the drum 110 (e.g., a forward radial portion of the drum 110) extending radially from the axial portion 111 to the cylinder shell 114. Although the radial portion 113 is illustrated as including two segments axially adjacent to one another, the present disclosure is not limited in this regard. For example, a single radial portion 113 may extend from the axial portion 111 to the cylinder shell 114 as described further herein.

The radial portion 113 of the feed head 112 may be coupled to the cylinder shell 114 (e.g., via a fastener or the like), or the radial portion 113 of the feed head 112 may be integral (i.e., formed of a single piece, or monolithic) with the cylinder shell 114. The present disclosure is not limited in this regard. Similarly, the discharge head 116 comprises an axial portion 115 of the drum 110 (e.g., an aft axial portion of the drum 110) defining a flange and a radial portion 117 of the drum 110 (e.g., an aft radial portion of the drum) extending radially from the axial portion 115 to the cylinder shell 114. The cylinder shell 114 extends axially from the radial portion 113 of the drum 110 to the radial portion 117 of the drum 110.

The drum assembly 101 at least partially defines a cavity 118 therein configured to receive the material to be grinded described previously herein. The drum assembly 101 is further configured to contain a plurality of balls during a grinding operation.

In various embodiments, the feed head 112 of the drum assembly 101 further comprises a drum inlet assembly 160 coupled to the drum 110. The drum inlet assembly 160 comprises a frame 162 and an inlet liner 164. In various embodiments, the frame 162 is configured to couple to the axial portion 111 of the drum 110. The inlet liner 164 defines an inlet to the cavity 118 for the drum assembly 101 that receives the material to be grinded. In this regard, any components axially forward of the inlet liner 164 may not be exposed to material to be grinded, in accordance with various embodiments.

The inlet liner 164 may be coupled to the frame 162. In various embodiments, the drum inlet assembly 160 is configured to prevent a backflow of material during a grinding operation. For example, the inlet liner 164 may define a forward radial flange configured to prevent a backflow of material axially aft of the inlet liner 164 as described further herein. In this regard, an input/output efficiency of the ball mill system 100 may be greatly enhanced relative to typical ball mill systems. "Axially forward" and "axially aft" as defined herein refers to a direction of travel for a material to be grinded during a grinding operation. For example, the material to be grinded enters an inlet defined by the drum inlet assembly 160 of the drum assembly 101 and travels axially aft along the cylinder shell 114 (i.e., from an axially forward end of the drum assembly 101 to an axially aft end of the drum assembly 101) through the cavity 118 of drum assembly 101 and out a drum outlet defined by the discharge head 116. Thus, the inlet of the drum assembly 101 is disposed at an axially forward end of the drum assembly 101 and the outlet of the drum assembly 101 is disposed at an axially aft end of the drum assembly 101.

The feed chute 120 comprises a main housing 122, an inlet housing 124 and a feed spout 130. The inlet housing 124 is configured to receive a material to be grinded in the ball mill system 100, which travels through the main housing 122 and is fed out the feed spout 130 into the drum assembly 101. The feed spout 130 comprises a tube 132 extending axially from the main housing 122 at least partially into the cavity 118 of the drum 110.

In various embodiments, a feed inlet liner 140 is disposed on a radially inner surface of the tube 132 of feed spout 130 as described further herein.

In various embodiments, the inlet liner 164 is spaced apart axially from the main housing 122 a first distance D1 and the tube 132 extends axially from the main housing 122 a second distance D2 to a distal end 123. In various embodiments, the first distance D1 is less than or equal to the second distance D2. In this regard, material to be grinded may exit the feed spout 130 at least at an axial beginning of the inlet liner 164 of the drum 110. In various embodiments, the inlet liner 164 defines a drum feed inlet radius R1 measured from the central axis 10. The drum feed inlet radius R1 may be smaller relative to typical drum feed inlet radiuses for ball mill systems. In this regard, a small radial gap between the tube 132 of the feed spout 130 and a radially inner surface of the inlet liner 164 may exist to allow rotation of the drum 110 relative to the feed spout 130. For example, the tube 132 may comprise an outer surface radius R2 also measured from the central axis 10. In various embodiments, the outer surface radius R2 may be between 95% and 100% of the drum feed inlet radius R1, or between 95% and 99.9%, or between 97% and 99.9%. In this regard, a radially outer surface of the tube 132 may be spaced apart very slightly from a radially inner surface of the inlet liner 164 for clearance purposes, in accordance with various embodiments.

In various embodiments, at least a portion of the inlet liner 164 of the drum inlet assembly 160 is disposed axially adjacent to the radial portion 113 of the feed head 112. In various embodiments, the inlet liner 164 may be integral with (e.g., monolithic, or formed from a single piece) the radial portion 113 of the feed head 112. The present disclosure is not limited in this regard.

As the feed spout 130 is coupled to the main housing 122 of feed chute 120, the feed spout 130 is fixed during operation of the ball mill system 100. In this regard, the drum 110 rotates relative to the feed spout 130 during operation of the ball mill system 100. Thus, the ball mill system 100 disclosed herein is configured to deposit the material to be grinded through the feed spout 130 proximate the inlet liner 164 of the drum assembly 101 and prevent a backflow of the material during operation of the ball mill system 100.

The feed chute 120 further comprises a feed inlet liner 140. The feed inlet liner 140 is disposed on a radially inner surface of the tube 132 of the feed spout 130. In various embodiments, the feed inlet liner 140 and the tube 132 of the feed spout extend further into the drum 110 relative to typical ball mill systems. For example, the feed inlet liner 140 and the tube 132 of the feed spout 130 may extend to, or extend beyond, in the axially forward direction, an axially forward end of the inlet liner 164.

Figure 2:
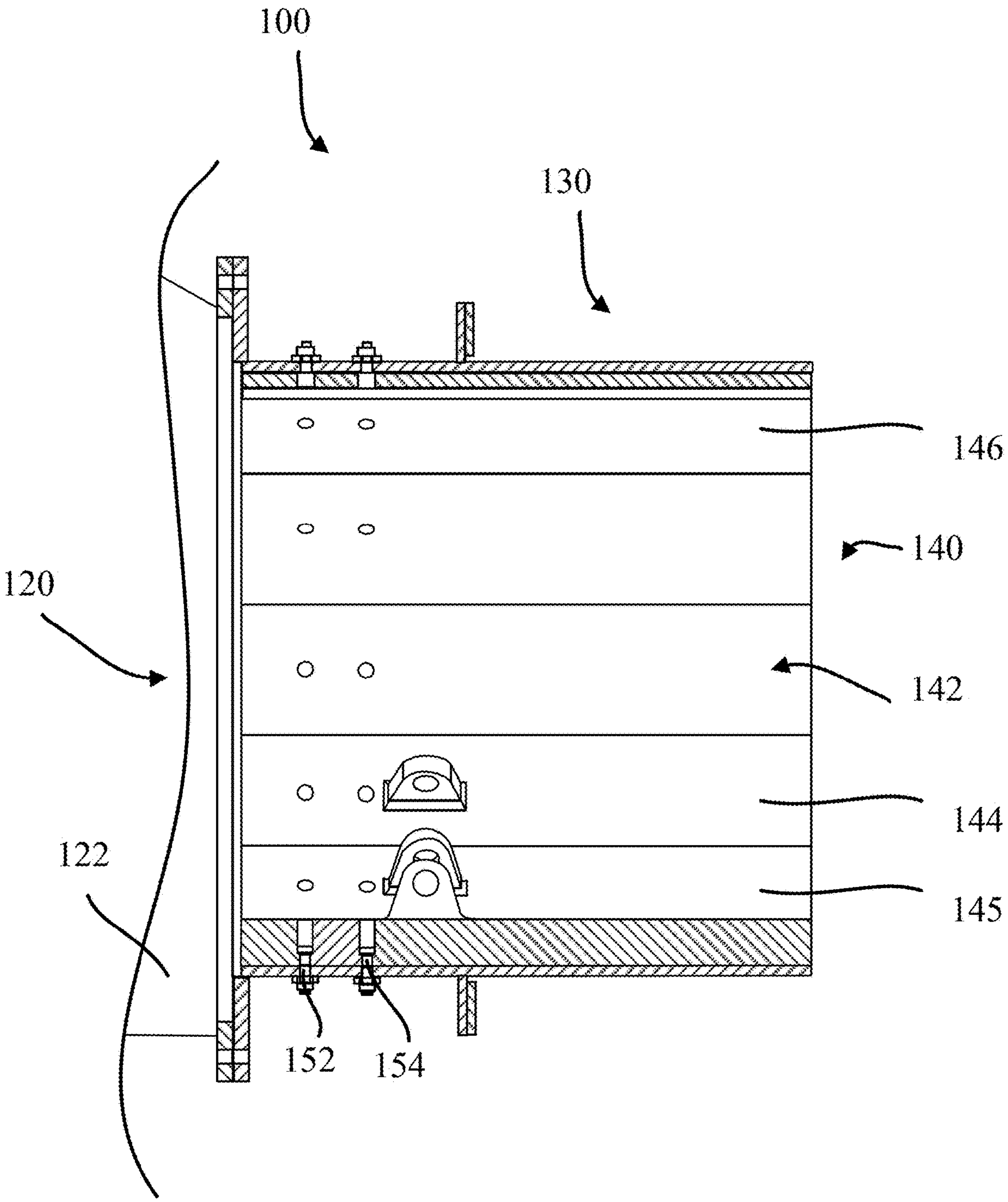
FIG. 2 illustrates a cross-sectional view of a portion of a feed chute, in accordance with various embodiments.

Referring now to FIG. 2, a cross-sectional view of a portion of the ball mill system 100 with a majority of the drum 110 removed for clarity, is illustrated in accordance with various embodiments. The feed inlet liner 140 comprises a plurality of liner segments 142. Each liner segment in the plurality of liner segments 142 is disposed circumferentially adjacent to an adjacent liner segment in the plurality of liner segments 142. In this regard, each liner segment in the plurality of liner segments 142 comprises an arcuate shape and is configured to form an annular shape in combination with the plurality of liner segments 142. In various embodiments, by utilizing a plurality of liner segments 142, maintenance may be easier relative to a single liner segment. For example, if one of the liner segments wears more relative to other liner segments, only that single liner segment may be replaced instead of replacing an entire liner segment, in accordance with various embodiments.

The plurality of liner segments 142 may include a set of cast liners 144 and a set of wear resistant plates 146. The set of cast liners 144 may be disposed in a bottom portion of the feed spout 130 and the set of wear resistant plates 146 may be disposed on a top portion of the feed spout 130 (i.e., the wear resistant plates 146 may be disposed vertically above the set of cast liners 144). Although illustrates as comprising a set of wear resistant plates 146 and a set of cast liners 144, the present disclosure is not limited in this regard. For example, the plurality of liner segments may include polymeric compounds, composites, or the like, in accordance with various embodiments. In various embodiments, the feed inlet liner 140 is configured to extend further into the cavity 118 of the drum assembly 101 relative to typical ball mill systems 100.

Each liner segment in the plurality of liner segments 142 is coupled to the feed spout 130. For example, a first fastener 152 and/or a second fastener 154 may couple a cast liner 145 in the set of cast liners 144 to the feed spout 130. Each liner segment in the plurality of liner segments 142 may be coupled to the feed spout 130 proximate the main housing 122 of the feed chute 120.

Figure 3A:
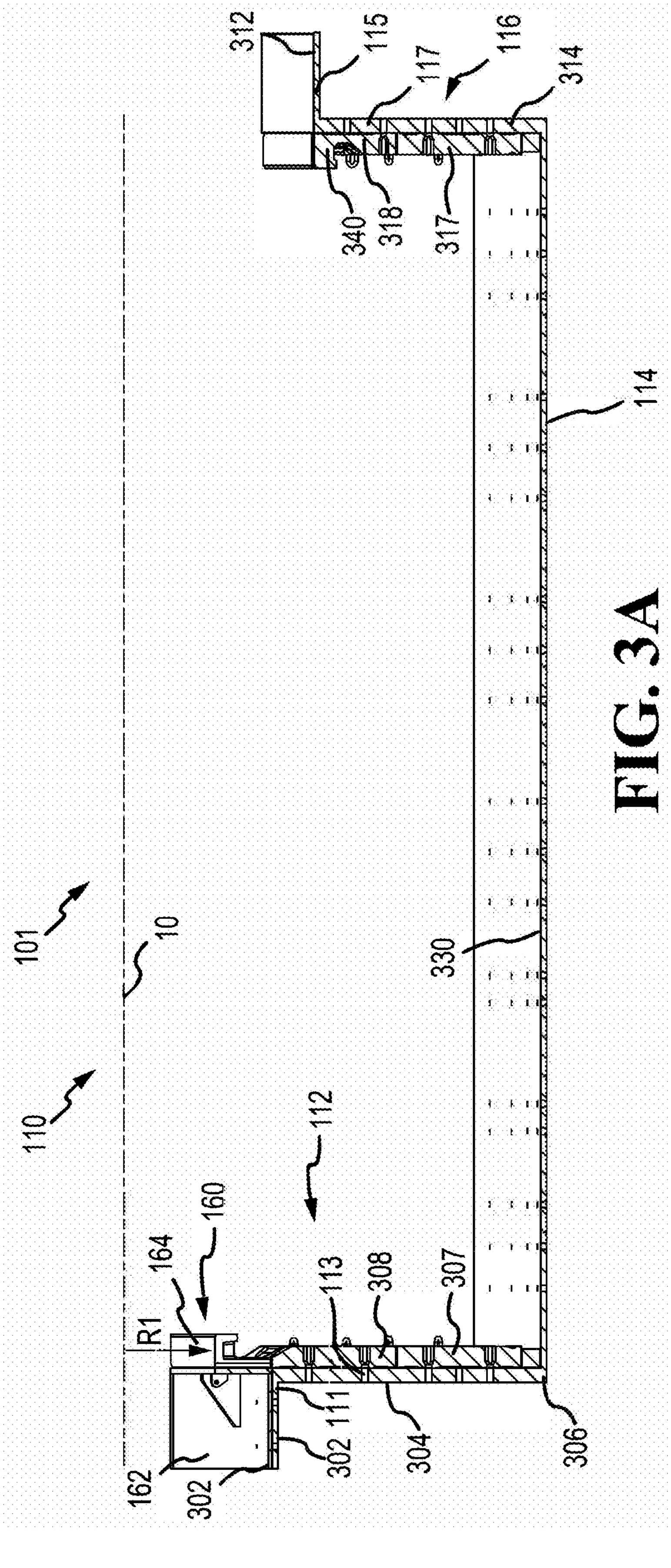
FIG. 3A illustrates a cross-sectional view of a drum assembly of a ball mill system, in accordance with various embodiments.

Referring now to FIG. 3A, a cross-sectional view of the drum 110 of FIG. 1, in accordance with various embodiments. The feed head 112 comprises the axial portion 111 and the radial portion 113 as described previously herein. The axial portion 111 defines a first flange 302. Similarly, the discharge head 116 comprises the axial portion 115 and the radial portion 117 as described previously herein. The axial portion 115 defines a second flange 312.

The first flange 302 may be configured to interface with a first bearing assembly on a radially outer surface and the second flange 312 may be configured to interface with a second bearing assembly on a radially outer surface. In this regard, the drum assembly 101 may be configured to rotate about the central axis 10 and interface with a first bearing assembly at a forward end with the first flange 302 and a second bearing assembly at an aft end with the second flange 312.

The frame 162 of the drum inlet assembly 160 comprises an axial portion 352 and a radial portion 354. The axial portion 352 is arcuate in shape (e.g., a semi-annular, annular, etc.). In this regard, the axial portion 352 is configured to interface with, and couple to, the first flange 302. The axial portion 352 may be semi-annular to facilitate ease of assembly for the drum assembly 101. The radial portion 354 extends radially inward from the axial portion 352 at a forward end of the axial portion 352. The radial portion 354 is configured to mate with, and be coupled to, the inlet liner 164. In this regard, the radial portion 354 may provide structural support, and facilitates assembly, for the inlet liner 164 of the drum inlet assembly 160 of the drum assembly 101.

The drum inlet assembly 160 may further comprise a stiffener 356, or a plurality of the stiffeners 356. The stiffener 356 may be coupled to the axial portion 352 and the radial portion 354 to provide greater structural support to the inlet liner 164. The stiffener 356 may provide structural support to the radial portion 354 of the frame 162 and the inlet liner 164, in accordance with various embodiments.

Although the radially inner surface of the second flange 312 is illustrated as not having liners, the present disclosure is not limited in this regard. For example, the radially inner surface of the second flange 312 may include a liner disposed thereon, in accordance with various embodiments.

In various embodiments, the radial portion 113 of the feed head 112 comprises a wall 304. The wall 304 extends radially outward from the first flange 302 to the cylinder shell 114. The wall 306 includes liners 307, 308 disposed therein. The liners 307, 308 may be configured to prevent wear of the wall 306, in accordance with various embodiments.

Although the cylinder shell 114 is illustrated without a liner disposed on a radially inner surface 330 of the cylinder shell 114, the present disclosure is not limited in this regard. For example, the cylinder shell 114 may include a liner mated with a radially inner surface 330 of the cylinder shell 114 upon assembly of the drum assembly 101 from FIG. 1. The liners disclosed herein may vary in material properties based on a position within the drum 110. For example, as liners are placed axially from the feed head 112 to the discharge head 116 from FIG. 1, different material properties may be desirable. In this regard, as the axial forward portion of the cylinder shell 114 is expected to see larger particle sizes relative to the axial aft portion of the cylinder shell 114, the liners disposed forward in the drum assembly 101 may be varied accordingly relative to liners disposed aft in the drum assembly 101, in accordance with various embodiments.

The radial portion 117 of the discharge head 116 comprises a wall 314. The wall 314 extends radially outward from the second flange 312 to the cylinder shell 114. The wall 316 interfaces with liner 317, 318. The liner 318 may at least partially define a drum discharge assembly 340.

Figure 3B:
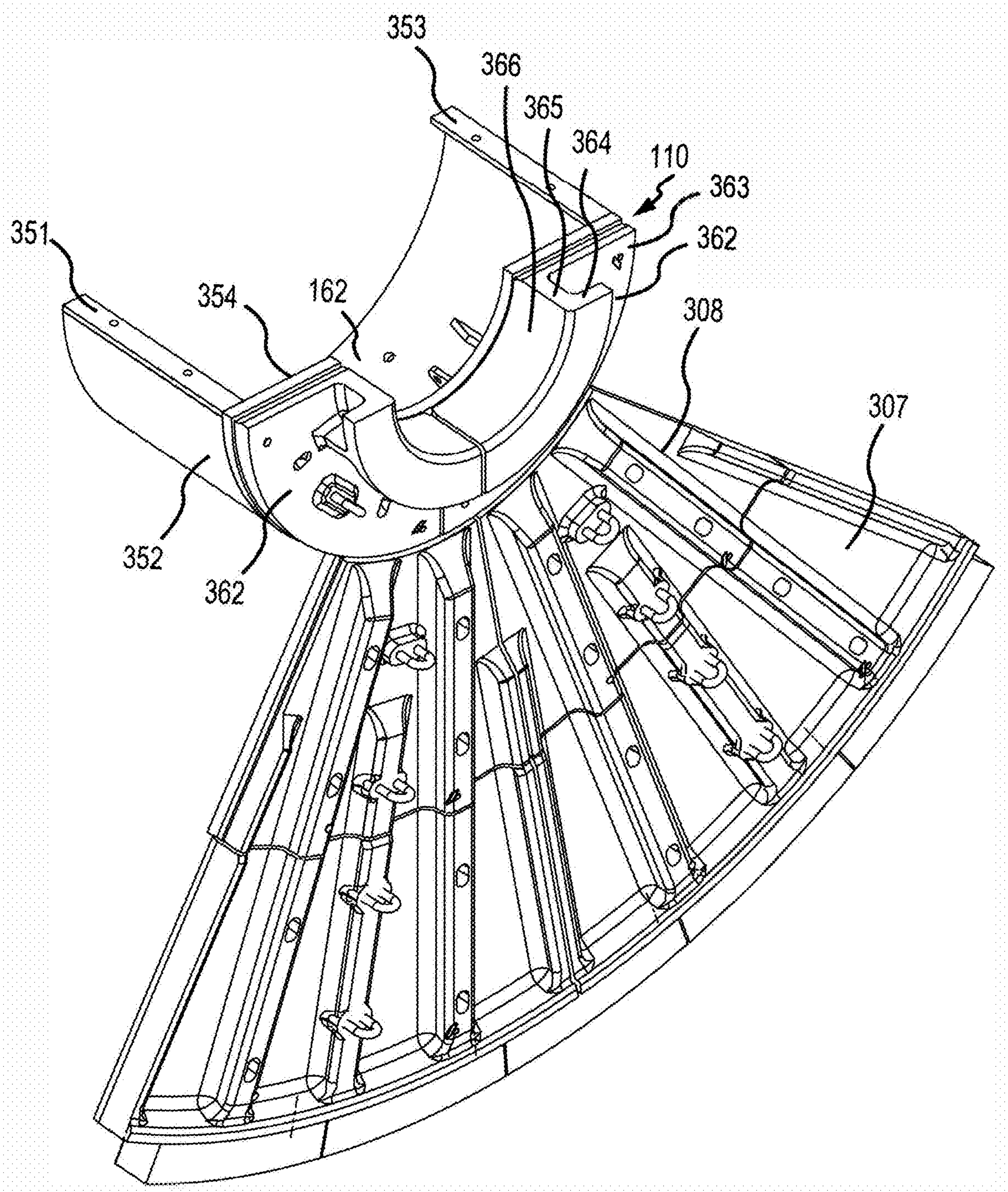
FIG. 3B illustrates a perspective view of a portion of feed head of a drum assembly of a ball mill system, in accordance with various embodiments.

Referring now to FIG. 3B, a perspective view of a portion of the feed head 112 of the drum assembly 101, with the drum 110 hidden for clarity, is illustrated, in accordance with various embodiments. The axial portion 352 of the frame 162 may define an arcuate surface extending from a first flange 351 to a second flange 353. The first flange 351 and the second flange 353 may each extend radially inward from a respective circumferential end of the axial portion 352. In various embodiments, the frame 162 may be configured to couple to a second frame in accordance with frame 162 to define an annular frame for use in the ball mill system 100 from FIG. 1. Although illustrated as comprising two frames 162 to facilitate assembly, any number of frames 162 may be utilized (e.g., 4 frames, 8 frames, etc.). The present disclosure is not limited in this regard.

The inlet liner 164 comprises inlet segments 362. In this regard, a plurality of inlet segments 362 are disposed circumferentially adjacent to each other to form the inlet liner 164. For example, four inlet segments 362 may be disposed circumferentially adjacent to each other (each inlet segment being revolved around a centerline by approximately 90 degrees) to form the inlet liner 164, in accordance with various embodiments. However, the present disclosure is not limited to any number of inlet segments 362, and one skilled in the art may recognize various numbers of inlet segments 362 without departing from the scope of this disclosure.

Each inlet segment 362 comprises an axially forward flange 363 spaced apart axially from an axially aft flange 364. A radially inner wall 365 extends from the axially forward flange 363 to the axially aft flange 364. A radially inner surface 366 of the radially inner wall 365 defines at least a portion of an inlet for the drum assembly 101, in accordance with various embodiments. Thus, the radially inner surface 366 may have a radius R1 as shown in FIG. 3A.

In various embodiments, axially forward flange 363 is configured to mate with, and be coupled to, the radial portion 354 of the frame 162 (e.g., via fasteners or the like). In various embodiments, the inlet segments 362 may be made of a cast iron alloy, such as that manufactured under the name Duracast® sold by Bradken Inc. in Kansas City, MO. Similarly, any of the liners disclosed herein (e.g., liners 307, 308, 317, 318, liner segments 142, or cast liners 144 from FIG. 2) may be made of a similar material, in accordance with various embodiments.

In various embodiments, the liners 307, 308 may also be liner segments spaced about circumferentially adjacent to one another. For example, liner 308 may include approximately eight liners disposed circumferentially adjacent one another to form an annular liner assembly (e.g., liner 308), in accordance with various embodiments. Similarly, liner 307 may include approximately eight liners disposed circumferentially adjacent to one another to form an annular liner assembly (e.g., liner 307), in accordance with various embodiments. The radially inner liner (e.g., liner 308) may be a different material, or a same material, as the radially outer liner (e.g., liner 307). The present disclosure is not limited in this regard. In various embodiments, the liners 307, 308 may be coupled to the wall 304 of drum 110 from FIG. 3A by any fastening method (e.g., via fasteners or the like).

In typical ball mill systems, a drum inlet is not defined, created, or formed. Typically, the feed spout releases a material to be grinded loosely into the drum assembly with little to no limits on the drum inlet or the drum outlet. In this regard, in typical systems, a feed rate may be based on preventing a backflow at the drum inlet as opposed to an optimal feed for ball mill efficiency. Thus, the inlet liner 164 disclosed herein is configured to prevent backflow of a material being grinded in the drum 110 and/or facilitate a significantly increased input/output of the ball mill system 100, in accordance with various embodiments.

In various embodiments, inlet segments 362 may be integral with radially inner segments (e.g., segments of liner 308) of the feed head 112 (e.g., monolithic or formed of a single piece). However, the present disclosure is not limited in this regard. In various embodiments by having separate distinct components for inlet segments 362 relative to segments of liner 308, the inlet liner 164 may be utilized in retrofit applications as well as in original manufacturing of drum assemblies type applications.

Figure 3C:
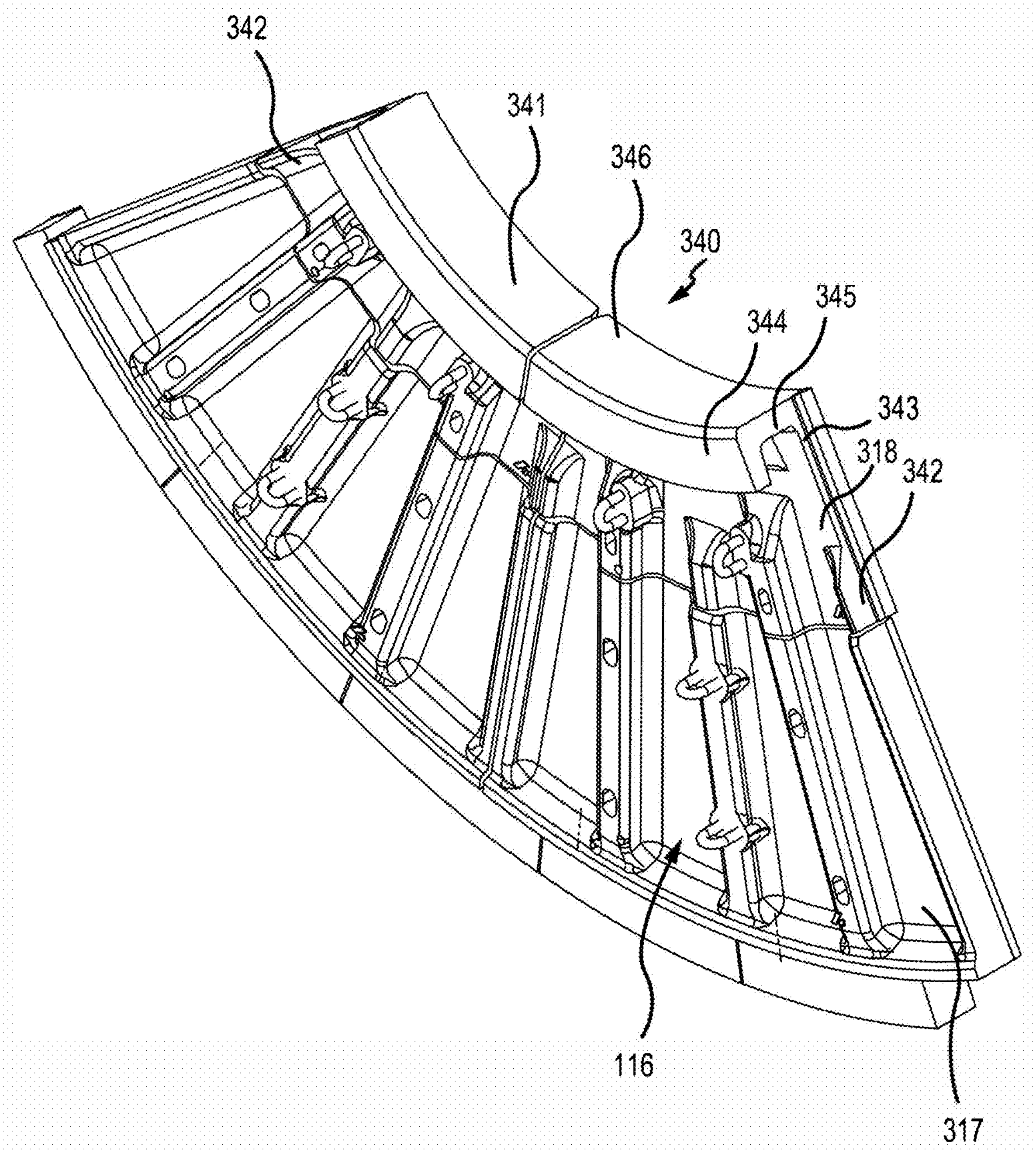
FIG. 3C illustrates a perspective view of a portion of discharge head of a drum assembly of a ball mill system, in accordance with various embodiments.

Referring now to FIG. 3C, a portion of the discharge head 116 of the drum assembly 101, with the drum 110 hidden for clarity, is illustrated, in accordance with various embodiments. The discharge head 116 comprises the liners 317, 318. The liners 317, 318 may also be liner segments spaced about circumferentially adjacent to one another. For example, liner 318 may include approximately eight liners disposed circumferentially adjacent one another to form an annular liner assembly (e.g., liner 318), in accordance with various embodiments. Similarly, liner 317 may include approximately eight liners disposed circumferentially adjacent to one another to form an annular liner assembly (e.g., liner 317), in accordance with various embodiments. Although liners 307, 308 of the feed head 112 from FIG. 3B and liners 317, 318 of the discharge head 116 are described herein with approximately eight arcuate segments defining an annular liner (e.g., liners 307, 308, 317, 318), the present disclosure is not limited in a number of segments forming the annular liner. For example, the annular liners may be formed of two or more segments and be within the scope of this disclosure.

The liner 318 comprises a plurality of outlet segments 341, 342. In this regard, the plurality of outlet segments 341, 342 are disposed circumferentially adjacent to each other to form a portion of the drum discharge assembly 340. Each outlet segment 341, 342 comprises an axially aft flange 343 spaced apart axially from an axially forward flange 344. A radially inner wall 345 extends from the axially forward flange 344 to the axially aft flange 343. A radially inner surface 346 of the radially inner wall 345 defines at least a portion of an outlet for the drum assembly 101.

In various embodiments, the shape of the liner 318 may increase efficiency of the ball mill system 100 from FIG. 1. For example, by having the axially forward flange 344 of the drum discharge assembly 340 being spaced apart axially from the axially aft flange 343, which mates to wall 314 of the drum 110 from FIG. 3A, the liner 318 may act as a ledge to catch grinded material exiting the ball mill system 100 from FIG. 1, in accordance with various embodiments.

In various embodiments, the radially inner liner (e.g., liner 318) may be a different material, or a same material, as the radially outer liner (e.g., liner 317). The present disclosure is not limited in this regard. In various embodiments, the liners 307, 308 may be coupled to the wall 314 of drum 110 from FIG. 3A by any fastening method (e.g., via fasteners or the like).

Figure 4A:
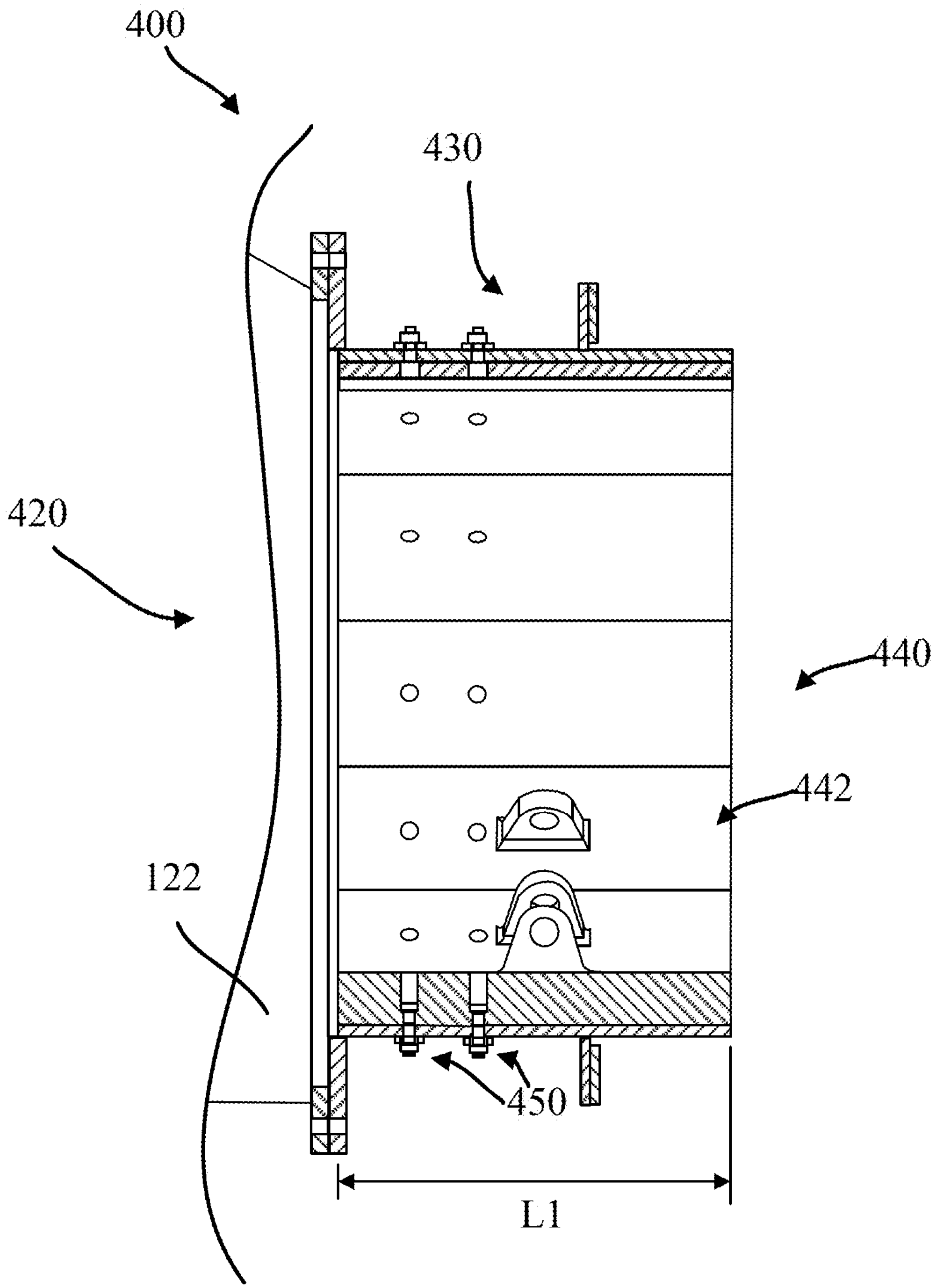
FIG. 4A illustrates a portion of a feed chute prior to a retrofitting process, in accordance with various embodiments.
Figure 4B:
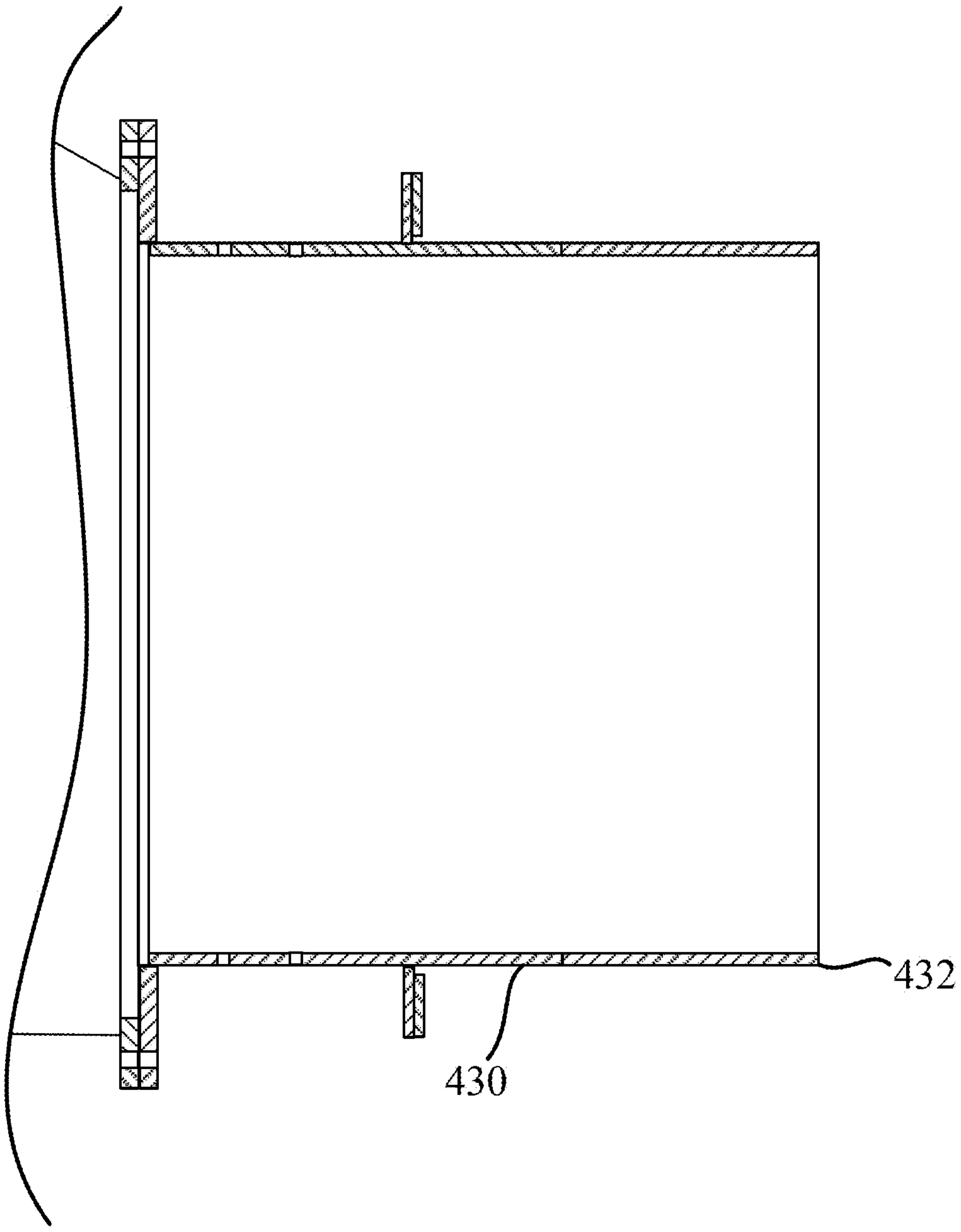
FIG. 4B illustrates a portion of a feed chute during a retrofitting process, in accordance with various embodiments.

Referring now to FIGS. 4A-C and 5, a process 600 (FIG. 5) is illustrated (FIGS. 4A-C) for retrofitting a feed chute 420 (FIG. 4A) to form an improved feed chute 520 (FIG. 4C) in accordance with various embodiments. The process 600 comprises decoupling a first liner assembly 440 from a feed spout 430 (step 602). Decoupling the first liner assembly 440 may include decoupling a plurality of fasteners 450 from each liner segment in a first plurality of liner segments 442 of the first liner assembly 440. In various embodiments, each liner segment in the first plurality of liner segments 442 may define a first axial length L1. Decoupling the plurality of fasteners 450 may include removing each fastener in the plurality of fasteners 450. After removing each fastener in the plurality of fasteners 450, each segment in the plurality of liner segments 442 may be removed from a radially inner surface of the feed spout 130 as shown in FIG. 4B.

The process 600 further comprises coupling an extended spout portion 432 to an axial end of the feed spout 430 (step 604). The axial end of the feed spout 430 may be disposed distal to the main housing 122 of the feed chute 420. In various embodiments, the extended spout portion 432 may be coupled to the feed spout 430 by any means of mechanical coupling, such as via fasteners, via welding, via brazing, or the like.

In various embodiments, step 604 may be replaced with decoupling the feed spout and coupling a second feed spout to the feed chute, the second feed spout including an extended spout portion (e.g., extended spout portion 432). In this regard, an extended portion may be coupled to a retrofitted feed spout, or a feed spout may be replaced (i.e., with a feed spout having a longer axial portion) to obtain a greater length for a retrofitted feed spout, in accordance with various embodiments.

In various embodiments, the process 600 further comprises coupling a second liner assembly 540 to the feed spout 430 (step 606). In this regard, the apertures through the feed spout 430 configured for the plurality of fasteners 450 from feed chute 420 may be re-utilized and the plurality of fasteners 450 may be re-utilized to couple the feed spout 430 to the second liner assembly 540. In various embodiments, the second liner assembly 540 is in accordance with the first liner assembly 440 from FIG. 4A with the exception that the second liner assembly 540 has a second axial length L2, that is greater than the first axial length L1. In this regard, the second axial length L2 may correspond to an axial length of an axial portion of the feed spout 530 formed from step 604 of process 600 as illustrated in FIG. 4B. In various embodiments, the improved feed chute 520 formed from process 600 may be in accordance with the feed chute 120 from FIGS. 1 and 2, in accordance with various embodiments. In this regard, the improved feed chute 520 may be configured to extend an inlet portion of the ball mill system 100 proximal the inlet liner 164 of the drum inlet assembly 160 from FIG. 1. In this regard, the improved feed chute 520 for an improved ball mill system 500 may be configured to further guide material to be grinded into the drum assembly 101 and/or result in greater efficiency relative to a feed chute 420 of a ball mill system 400 as illustrated in FIG. 4A, in accordance with various embodiments.

Figure 6A:
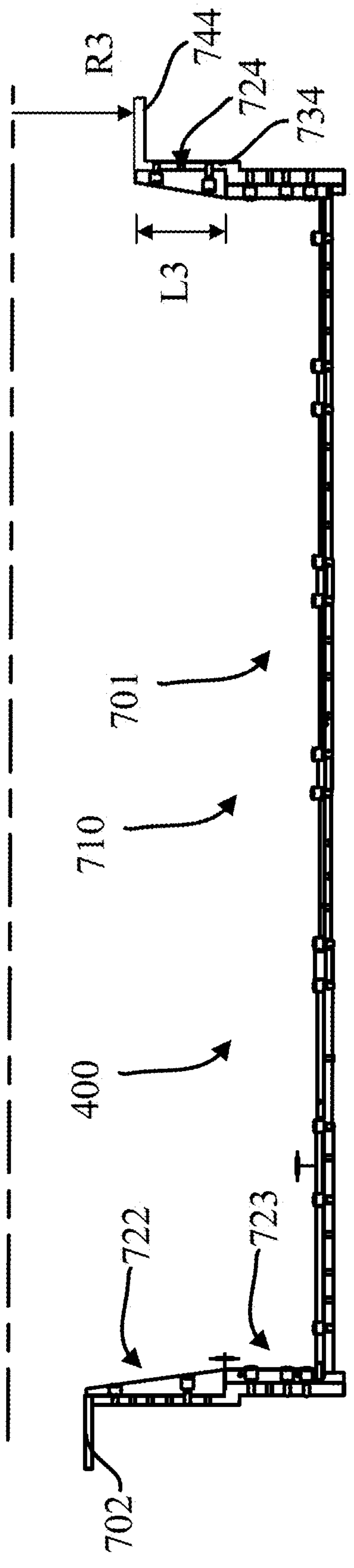
FIG. 6A illustrates a drum prior to a retrofitting process, in accordance with various embodiments.
Figure 6B:
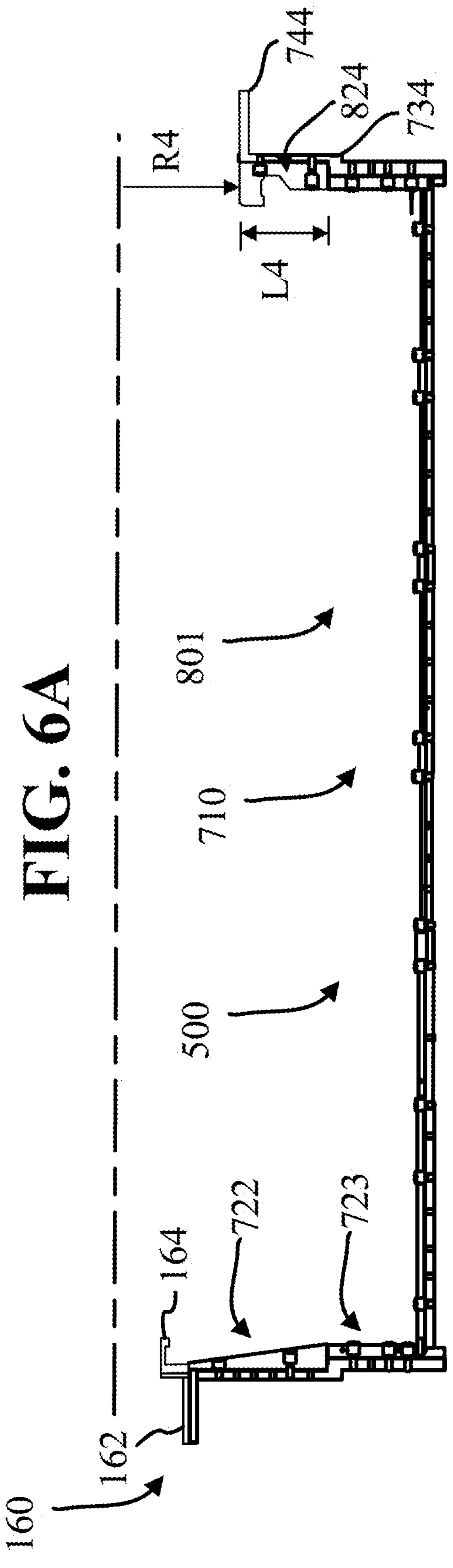
FIG. 6B illustrates a drum after the retrofitting process, in accordance with various embodiments.
Figure 7:
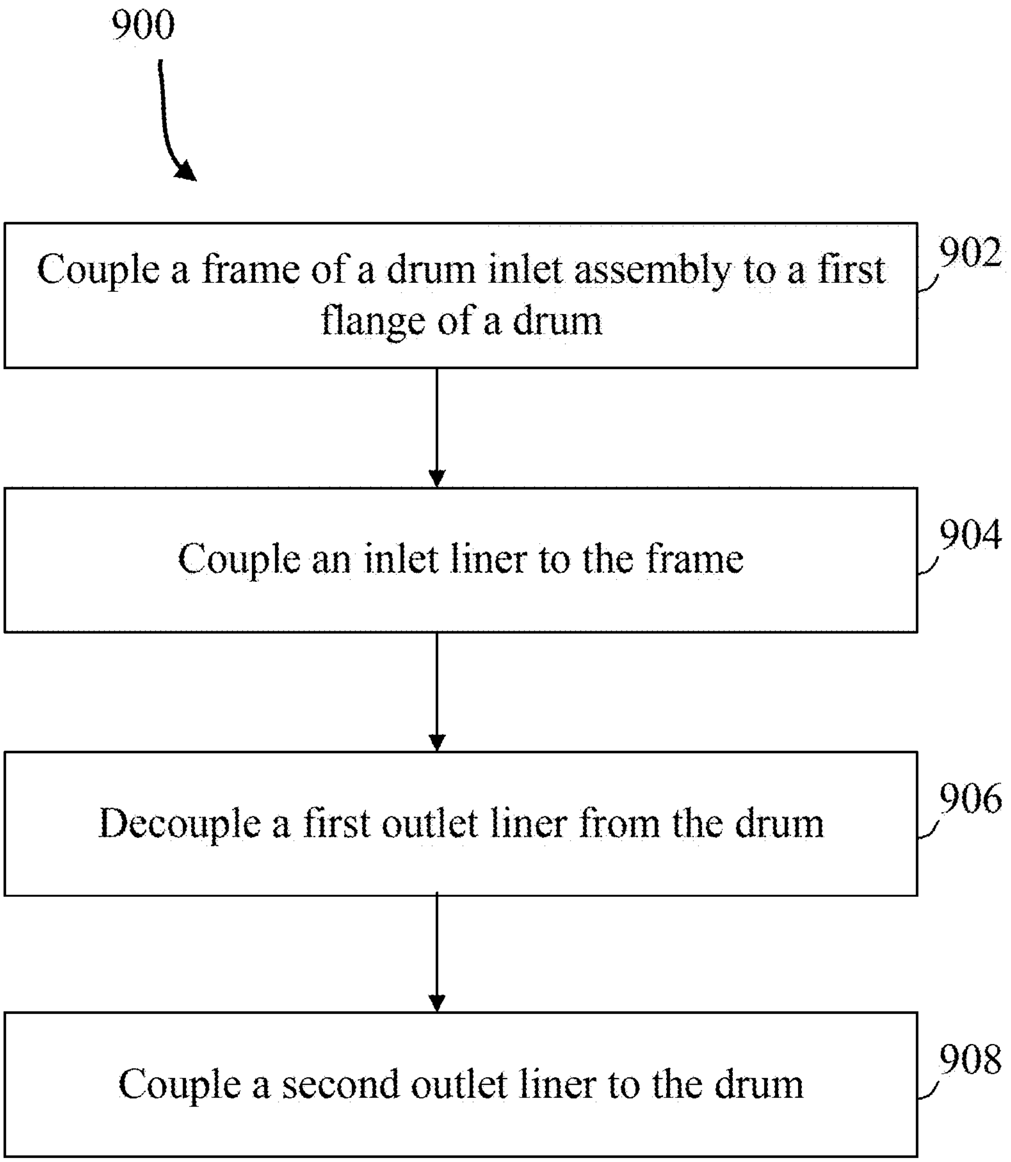
FIG. 7 illustrates a retrofitting process, in accordance with various embodiments.

Referring now to FIGS. 6A-B and 7, a process 900 (FIG. 7) is illustrated (FIGS. 5A-B) for retrofitting a drum 710 (FIG. 6A) of a ball mill system 400 to form an improved ball mill system 500 (FIG. 6B) in accordance with various embodiments. The process 900 comprises coupling a frame 162 of a drum inlet assembly 160 to a first flange 702 of a drum 710 (step 902). In various embodiments, the frame 162 may be formed from two semi-annular frames, or the like. The present disclosure is not limited in this regard. The frame 162 may be coupled to the first flange 702 via fasteners or any other coupling means.

The process 900 further comprises coupling an inlet liner 164 of the drum inlet assembly 160 to the frame (step 904). In this regard, the drum inlet assembly 160 described previously herein is formed. Step 904 may further comprise coupling each segment in a plurality of inlet segments 362 from FIGS. 3A-B to the frame 162. Thus, the inlet liner 164 of the drum inlet assembly 160 defines a drum inlet via the radially inner surfaces 366 of the inlet segments 362 from FIG. 3B.

Figure 4C:
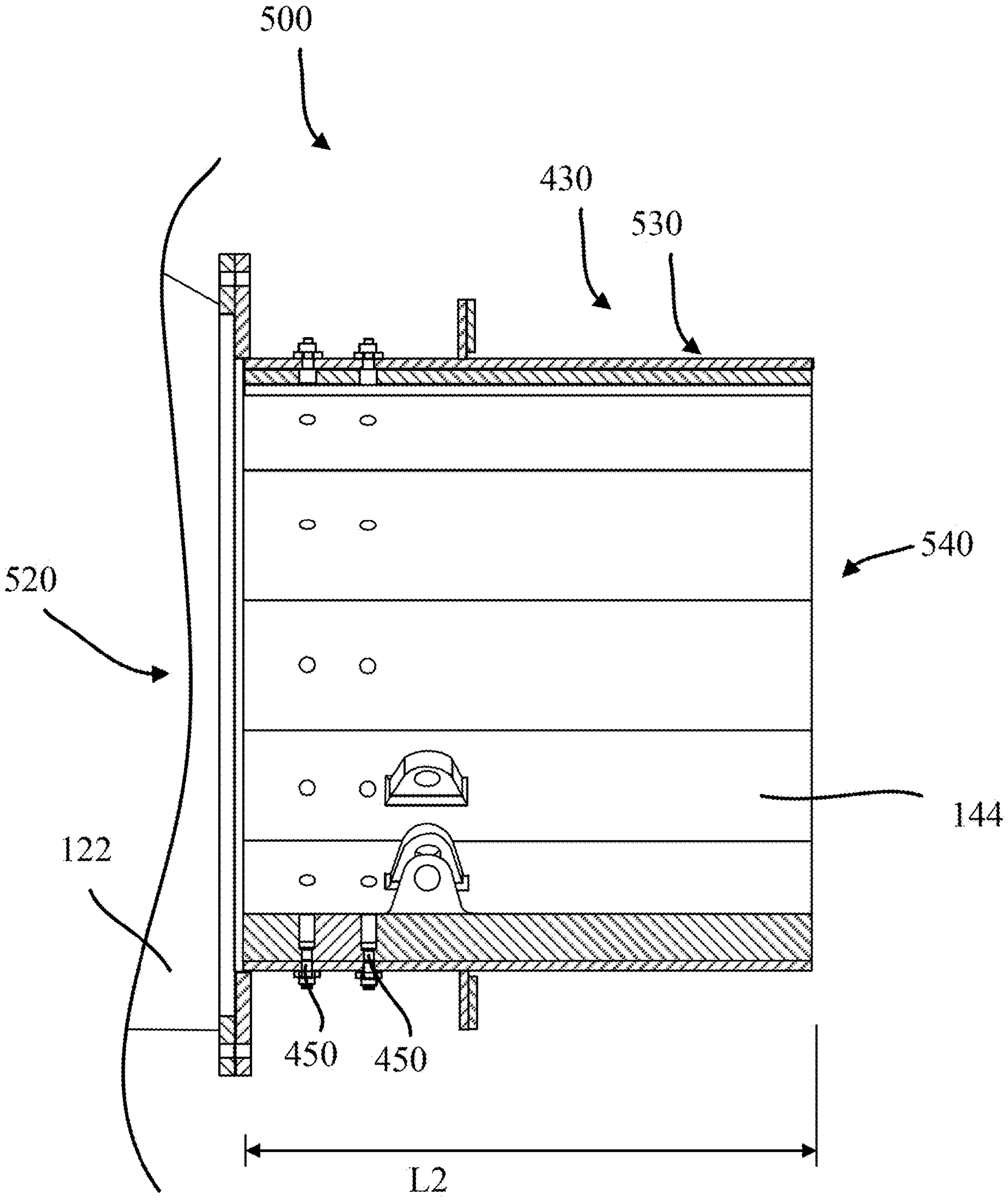
FIG. 4C illustrates a portion of a feed chute after to a retrofitting process, in accordance with various embodiments.
Figure 5:
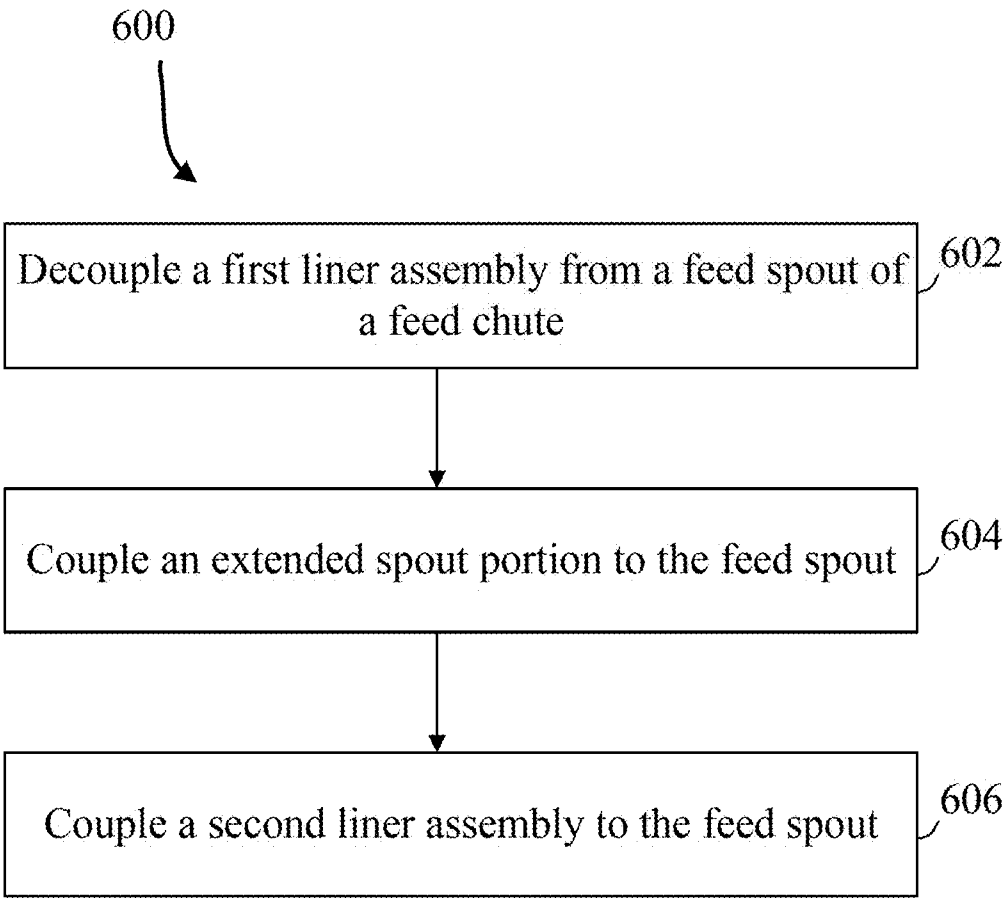
FIG. 5 illustrates a retrofitting process, in accordance with various embodiments.

In various embodiments, the extended spout portion 432 of the improved feed chute 520 from FIG. 4C is configured to be proximal to the inlet liner 164 during operation of the improved ball mill system 500 from FIG. 4C. The inlet liner 164 is configured to prevent a backflow of material being grinded in the improved drum assembly 801 (FIG. 6B). Thus, by coupling the drum inlet assembly 160 to a drum 710 of a drum assembly 701 (FIG. 6A), an improved drum assembly 801 (FIG. 6B) having an improved inlet configuration may be created with the same drum 710. Additionally, the inlet liners 722, 723 may remain the same, resulting in minimal assembly work for an improved inlet configuration for an improved drum assembly 801 (FIG. 6B). In various embodiments, apertures may be bored into the first flange 702 to facilitate fasteners, or the like, to couple the frame 162 to the first flange 702.

The process 900 further comprises decoupling a first outlet liner 724 from an aft radial wall 734 of the drum 710 (step 906). The first outlet liner 724 may comprise a plurality of circumferentially adjacent liner segments disposed on an axial surface of the aft radial wall 734. The aft radial wall 734 may be in accordance with, or substantially similar to, the wall 314 from FIG. 3A. In various embodiments, the aft radial wall 734 includes a plurality of apertures configured to receive respective fasteners for coupling the first outlet liner 724 to the aft radial wall 734.

In various embodiments, the first outlet liner 724 may be tapered (i.e., increasing in thickness as the first outlet liner 724 extends in a radially outward direction). In this regard, the first outlet liner 724 may have been configured to direct a material that has been grinded in the drum 710 axially aft out the discharge end of the drum 710 in accordance with various embodiments. In various embodiments, the first outlet liner 724 comprises a first length L3 defined in the radial direction.

The process 900 further comprises coupling a second outlet liner 824 to the aft radial wall 734 to partially form an improved drum assembly 801 (step 908). The second outlet liner 824 includes a plurality of circumferentially adjacent liner segments (e.g., outlet segments 341, 342 from FIG. 3B) disposed on an axial surface of the aft radial wall 734. The second outlet liner 824 includes a lip extending forward into the drum 810 and defining a ledge to catch materially be grinded to discharge through the drum outlet defined by the second outlet liner 824. In this regard, the second outlet liner 824 may also be configured to direct a material grinded in the improved drum assembly 801 axially aft and out the discharge end of the improved drum assembly 801. In various embodiments, the second outlet liner 824 includes a plurality of apertures configured to align with the plurality of apertures in the aft radial wall 734 of the improved drum assembly 801.

The second outlet liner 824 comprises a second length L4 defined in the radial direction. The second length L4 is substantially similar to the first length L3 (e.g., equal plus or minus 2%, or equal plus or minus 1%). In this regard, the second outlet liner 824 is configured to maintain an output radius of the improved drum assembly 801 (e.g., output radius R3 of drum assembly 701 is substantially equal to an output radius R4 of improved drum assembly 801). In this regard, an improved outlet liner 824 may be installed to form the improved ball mill system 500 while maintaining a designed output diameter for the ball mill system 400. For example, the second outlet liner 824 may be aligned radially with a second flange 744 that extends in an aft axial direction from the aft radial wall 734. The second flange 744 may define the first output radius R3 of the ball mill system 400 being retrofitted via process 900.

In various embodiments, the retrofit processes 600, 900 may performed sequentially to form the improved ball mill system 500. In this regard, the benefits of the ball mill system 100 from FIG. 1 may be achieved by retrofitting a ball mill system 400 to form the improved ball mill system 500 as described herein.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein.

The method and system described herein may be implemented to improve efficiencies of ball mill devices and systems. Other advantages and features of the present systems and methods may be appreciated from the disclosure herein and the implementation of the method and system.

I claim:

1. A retrofitting process for a ball mill system, the retrofitting process comprising:

decoupling a first plurality of liner segments from an aft radial wall of a drum of the ball mill system; and coupling a second plurality of liner segments to the aft radial wall of the drum, each of the second plurality of liner segments disposed circumferentially adjacent to an adjacent segment of the second plurality of liner segments, each of the second plurality of liner segments including a ledge extending axially forward from a radially inner end of each of the second plurality of liner segments into a cavity of the drum.

2. The retrofitting process of claim 1, wherein each of the first plurality of liner segments disposed circumferentially adjacent to an adjacent segment of the first plurality of liner segments.

3. The retrofitting process of claim 1, wherein each of the second plurality of liner segments includes an axially aft flange spaced apart axially from an axially forward flange.

4. The retrofitting process of claim 3, wherein each of the second plurality of liner segments includes a radially inner wall extending from the axially forward flange to the axially aft flange, the radially inner wall defining the ledge.

5. The retrofitting process of claim 3, wherein the coupling the second plurality of liner segments to the aft radial wall includes coupling the axially aft flange of each of the second plurality of liner segments to the aft radial wall.

6. The retrofitting process of claim 1, further comprising adapting an inlet of a drum assembly to modify an outer radius of a feed spout to be between 95% and 100% of an inner radius of an inlet liner of the drum, wherein the drum assembly includes the drum and the inlet liner.

7. The retrofitting process of claim 1, further comprising forming a discharge assembly in response to the coupling the second plurality of liner segments to the aft radial wall of the drum.

8. The retrofitting process of claim 1, wherein the ledge of each of the second plurality of liner segments is configured to catch grinded material exiting the ball mill system during an operation of the ball mill system.

9. The retrofitting process of claim 1, wherein each of the first plurality of liner segments includes a sloping surface that slopes from a radially outer end in an axially aft and radially inward direction toward a radially inner end of the aft radial wall proximate an outlet of the drum.

10. The retrofitting process of claim 1, further comprising adapting an inlet of the drum to reduce a cross-sectional area of the inlet of the drum.

11. The retrofitting process of claim 10, further comprising adapting an axial length of a feed spout of the ball mill system.

12. The retrofitting process of claim 11, wherein the adapting the axial length of the feed spout further comprises extending the axial length of the feed spout to or beyond an axially forward end of an inlet liner.

13. The retrofitting process of claim 12, further comprising:

coupling a frame to a first flange of the drum, the first flange disposed at the axially forward end of the drum; and coupling the inlet liner to the frame, the inlet liner defining a drum inlet radius of a drum assembly.

14. The retrofitting process of claim 13, wherein the inlet liner is configured to prevent a backflow of material during operation of the ball mill system.

15. The retrofitting process of claim 14, wherein the inlet liner comprises a forward radial flange that is configured to prevent the backflow of material during the operation of the ball mill system.

16. The retrofitting process of claim 1, wherein the drum further comprises a forward radial wall spaced apart axially from the aft radial wall and a cylinder shell extending axially from a first radially outer end of the forward radial wall to a second radially outer end of the aft radial wall.

17. The retrofitting process of claim 16, wherein the drum further comprises a first flange extending axially forward from the forward radial wall and a second flange extending axially aft from the aft radial wall.

18. The ball mill system formed by the retrofitting process of claim 1.

19. A drum assembly for a ball mill system, the drum assembly comprising:

a drum comprising a cavity and an aft radial wall; and a plurality of liner segments coupled to the aft radial wall of the drum, each of the plurality of liner segments disposed circumferentially adjacent to an adjacent segment of the plurality of liner segments, each of the plurality of liner segments including a ledge extending axially forward from a radially inner end of each of the plurality of liner segments into the cavity of the drum.

20. The ball mill system comprising the drum assembly of claim 19, the ball mill system further comprising a feed spout extending an axially to or beyond an axially forward end of an inlet liner of the drum assembly.

* * * * *